VOLTAGE DISTRIBUTION CIRCUIT ARRANGEMENTS FOR HIGH-DENSITY PACKAGING OF ELECTRONIC SYSTEMS

Filed June 13, 1966 7 Sheets-Sheet 1

INVENTORS
WARREN G. POND
FRANK E. COONEY
CHARLES M. MEZNARICH

BY Louis A Kline
John J. Matlago
Richard J. Ringel
THEIR ATTORNEYS

INVENTORS
WARREN G. POND
FRANK E. COONEY
CHARLES M. MEZNARICH
Louis A. Kline
BY John J. Matlago
Richard D. Lengel
THEIR ATTORNEYS

INVENTORS
WARREN G. POND
FRANK E. COONEY
CHARLES M. MEZNARICH

BY [signatures]
THEIR ATTORNEYS

Feb. 6, 1968 W. G. POND ET AL 3,368,117

VOLTAGE DISTRIBUTION CIRCUIT ARRANGEMENTS FOR HIGH-DENSITY PACKAGING OF ELECTRONIC SYSTEMS

Filed June 13, 1966

7 Sheets-Sheet 4

INVENTORS
WARREN G. POND
FRANK E. COONEY
CHARLES M. MEZNARICH

BY Louis A. Kline
John J. Matlago
Richard A. [signature]

THEIR ATTORNEYS

INVENTORS
WARREN G. POND
FRANK E. COONEY
CHARLES M. MEZNARICH

BY Louis A. Kline
John J. Marlago
Richard L. [illegible]
THEIR ATTORNEYS

INVENTORS
WARREN G. POND
FRANK E. COONEY
CHARLES M. MEZNARICH

BY

THEIR ATTORNEYS

INVENTORS
WARREN G. POND
FRANK E. COONEY
CHARLES M. MEZNARICH

BY Louis A. Kline
John J. Matlago
Richard F. Lengel
THEIR ATTORNEYS

United States Patent Office 3,368,117

Patented Feb. 6, 1968

3,368,117

VOLTAGE DISTRIBUTION CIRCUIT ARRANGEMENTS FOR HIGH-DENSITY PACKAGING OF ELECTRONIC SYSTEMS

Warren G. Pond, Los Angeles, Frank E. Cooney, Manhattan Beach, and Charles M. Meznarich, Torrance, Calif., assignors to The National Cash Register Company, Dayton, Ohio, a corporation of Maryland Filed June 13, 1966, Ser. No. 556,988
10 Claims. (Cl. 317—101)

ABSTRACT OF THE DISCLOSURE

A high-density packaging electronic system structure with improved voltage distribution circuit arrangements utilizing voltage planes which provide a large distributed capacitance for supply voltages.

The present invention relates to voltage distribution circuit arrangements for electronic systems and, more particularly, to improved interconnection of voltages to integrated circuits assembled in a high-density circuit environment.

In general, electronic systems which require a very large number of high-speed circuits in the final mechanization thereof utilize high-density circuit packaging. In the type of high-density circuit packaging referred to herein, individual microcircuits are located on circuit boards which are mounted on connector panels. Preferably, each connector panel in an electronic data processing system comprises a logical subdivision of the system. Each of these connector panels supports the circuit boards in a uniform, compact arrangement and also provides for circuit interconnection to the circuit boards on the respective connector panel.

The most obvious advantage of this type of high-density circuit packaging is the reduction in space required for any electronic system. Other advantages are reduction in length of circuit interconnections for high speed operation and simplifying access to logical circuits for testing purposes. In order to retain these advantages, adequate provision must be made for interconnections of supply voltages to the system, which requires very low inductive impedance and large distributed capacity in voltage supply circuit paths to substantially all of the circuits supplied from the power supply source. Provision of these supply circuit paths from voltage sources to thousands of individual logical circuits of a data processing system presents an extremely difficult problem in circuit packaging if high-density compactness and advantages thereof are to be retained.

Briefly, therefore, the present invention provides for improved distribution of supply voltages in high-density packaging by novel structural arrangements which overcome the difficult problems involved in interconnections between supply sourues and individual logical circuits, circuit boards and panels forming the system. Distribution of supply voltages in high-density packaging is the most critical problem area because of the high frequencies and large current requirements at low voltages. For example, the voltage distribution for integrated logic circuits in a data processing system often requires supplying two hundred (200) amperes of current at the high logical level (e.g., 4 volts). In order to maintain the high logical voltage level within a voltage variation of $\pm 3\%$ at high frequencies (switching frequencies), the present invention must not only provide a large distributed capacitance throughout the supply voltage circuits, but also reduce the length of supply voltage circuit paths to logical circuits of respective connector panels to reduce the time delay for supplying the high logical level to many circuits in different areas on each connector panel under rapidly changing load conditions.

In many instances, logical circuits are susceptible to noise and no longer have adequate noise immunity under rapidly changing load conditions introducing voltage variations of over $\pm 3\%$, for example. Accordingly, greater variation of supply voltage will not provide the desired reliability of the system. It is important to realize that time delay in a voltage supply circuit is caused by high frequency, inductive impedance in which "skin effect" is one of the most important considerations. The high frequency supply voltage changes at the individual logical circuits (e.g., collector voltages $V_{cc}$) on circuit boards occur as a result of changes in logical level of a large number of logical circuits physically located in different areas of each connector panel. While the changes in logical level of the individual logical circuits occur at seventy (70) megacycles, the changes in distribution to the logical circuits at different locations on a single connector panel occur in the range of 50 to 100 kilocycles. Accordingly, one of the features of the present invention is to provide ample supply voltage distribution to the logical circuits at different locations on each of the individual connector panels in the 50 to 100 kilocycle frequency range to avoid time delay in supplying the high logical voltage level to all the logical circuits in order to maintain system reliability.

Thus, it is an object of the present invention to distribute supply voltages to logical circuits at high frequencies to maintain logical levels of the circuits in a data processing system.

In providing interconnections having this low impedance at high frequencies, the novel structural arrangements of the present invention provide circuit interconnections which are compatible with the most desirable modes of high-density circuit packaging arrangements which provide for automated "wire-wrap" connections and other connection techniques having maximum utility in high-density packaging of electronic and microelectronic circuitry, including monolithic integrated circuits. The manner in which these interconnections are provided is made readily apparent later in the detailed description of the invention.

Accordingly, it is an object of the present invention to provide voltage distribution circuit arrangements having the foregoing features and advantages.

Another object is the provision of low inductive impedance and large distributed capacitance for supply voltage circuit paths in high-density packaging of microelectronic systems.

A further object is to provide supply voltage circuitry capable of supplying a large current at a predetermined low voltage to a very large number of integrated circuits in an electronic system.

Another object of the present invention is to provide high frequency voltage distribution to logical circuits of each logical subdivision of a data processing system.

Still another object is the provision of a flexible voltage distribution connection providing a low impedance path having a large distributed capacitance for supplying large currents of high frequency and low voltages from a power supply source to a very large number of circuits on a connector panel disposed and arranged for relative movement.

Another object of the present invention is to provide a connector panel formed from laminated, planar sheets of conductive material for low impedance supply circuit interconnections having a relatively large distributed capacitance capable of providing supply voltages at high frequencies to a very large number of integrated circuits on the connector panel.

A further object of the present invention is the provision of voltage supply circuitry for high-density packaging of integrated logical circuits of an electronic data processing system.

Other objects and features of the invention will become apparent to those skilled in the art as the disclosure is made in the following detailed description of preferred embodiments of the invention as illustrated in the accompanying sheets of drawings in which.

Figure 2:
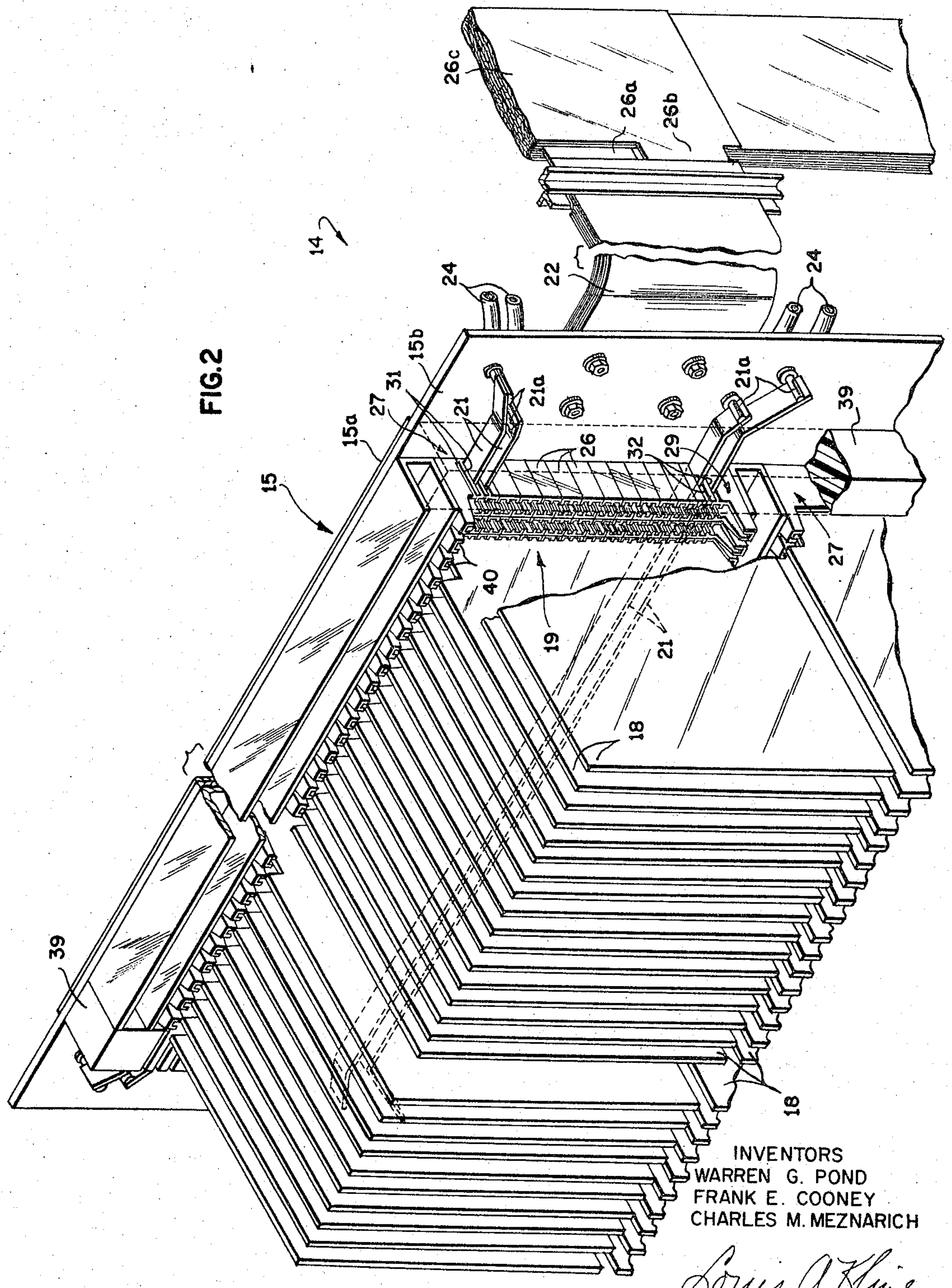
FIG. 2 is a perspective view of the present invention showing a typical connector panel section, partially broken away, and a stationary voltage supply bus for providing individual interconnections to the connector panel section by a flexible voltage conductor strip.
Figures 3, 3A:
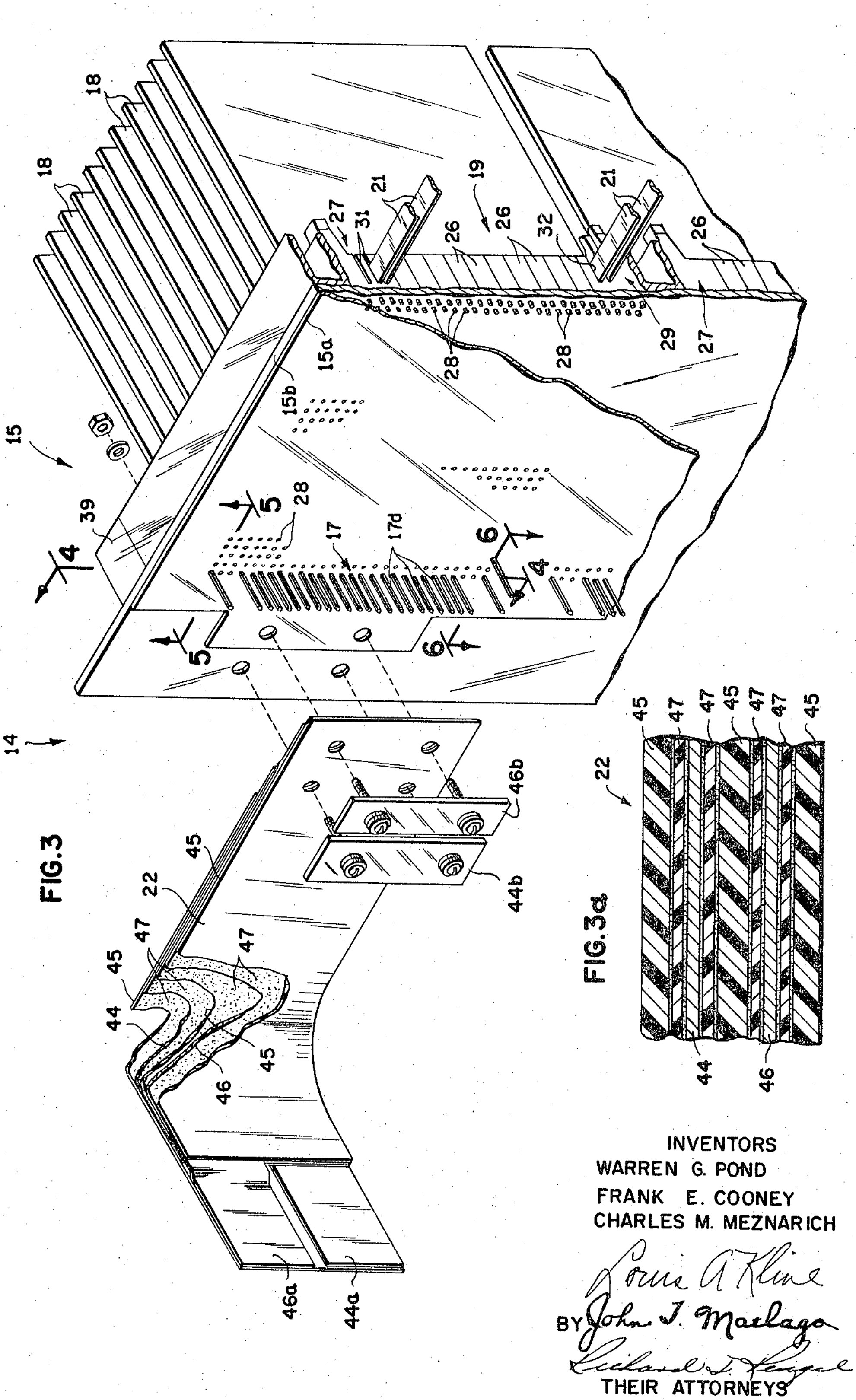
FIG. 3 is a perspective view of the back side of a portion of the connector panel section shown in FIG. 2 with the flexible voltage conductor strip partially broken away and connections to the panel section shown exploded to view the details of construction thereof.

FIG. 3*a* is a greatly enlarged cross sectional view of a portion of the flexible voltage conductor strip shown in FIGS. 2 and 3.

Figure 3B:
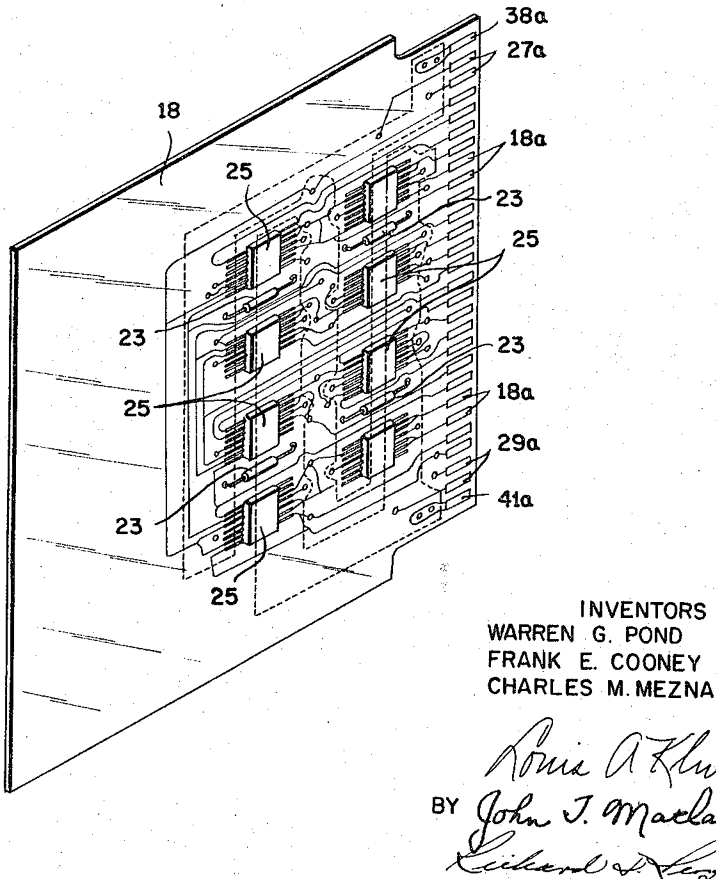

FIG. 3*b* is a perspective view of a typical microcircuit board having monolithic integrated circuits mounted thereon.

Figure 4A:
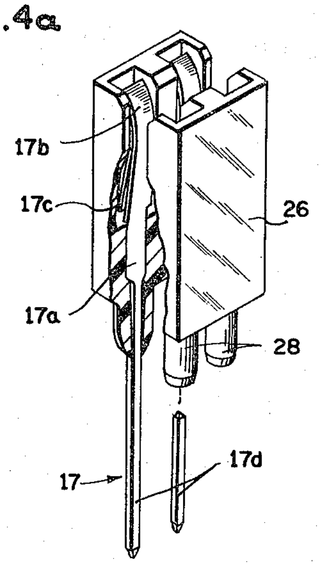
Figure 4:
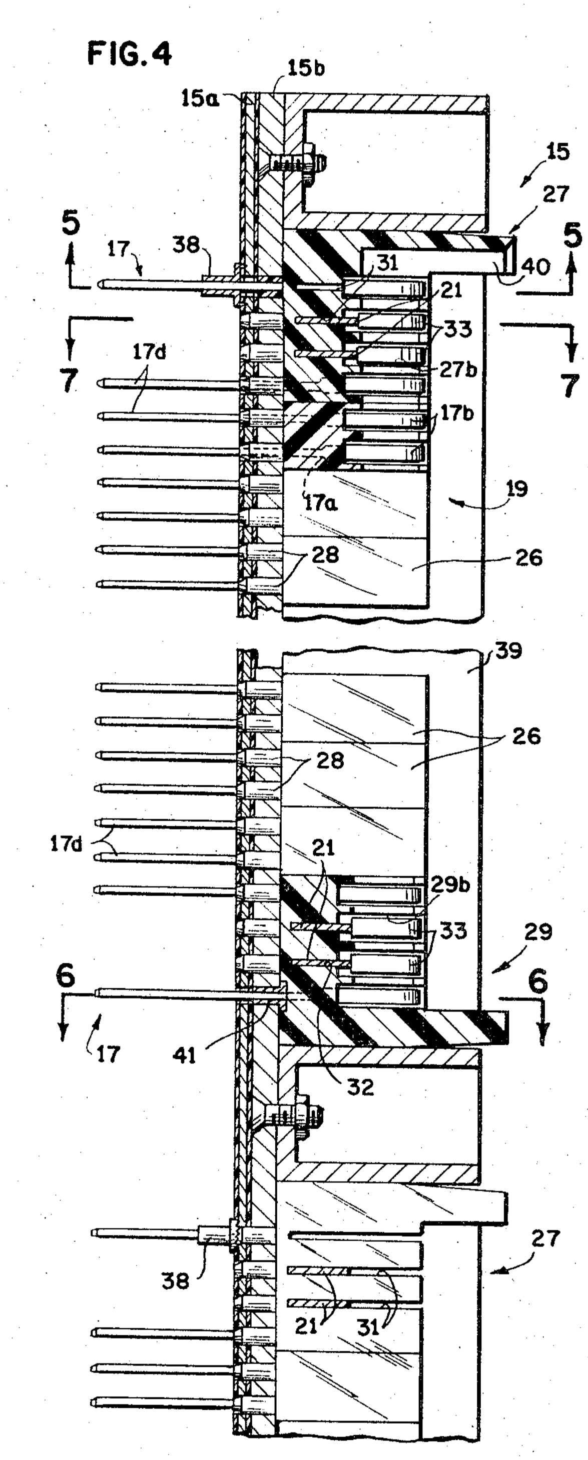

FIG. 4 is an enlarged sectional view, partially broken away, of the connector panel shown in FIG. 3, taken along line 4—4 in the direction of the arrows, to show the structural arrangement of a typical connector strip.

FIG. 4*a* is an enlarged perspective view of a typical plastic housing for a center connector module of the connector strip shown in FIG. 4.

Figure 5:
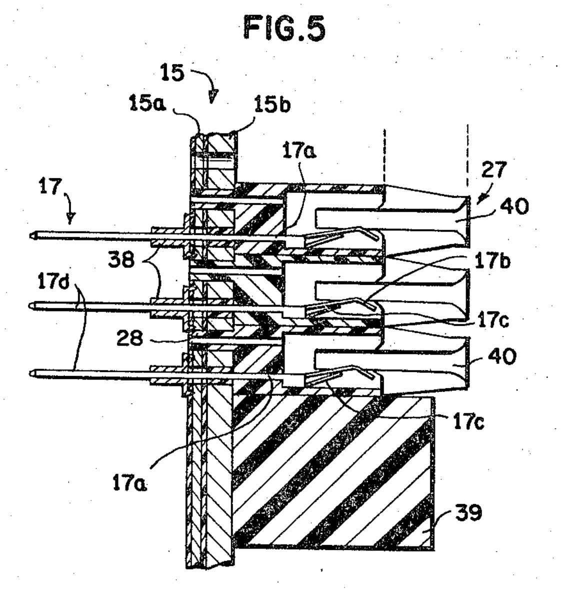

FIG. 5 is a sectional view of a portion of the connector panel shown in FIGS. 3 and 4, taken along line 5—5 in the direction of the arrows, to show the structural arrangement of three typical upper end connector modules of three adjacent connector strips.

Figure 6A:
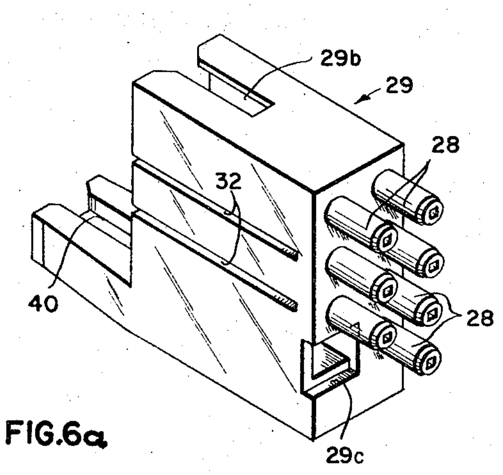
Figure 6:
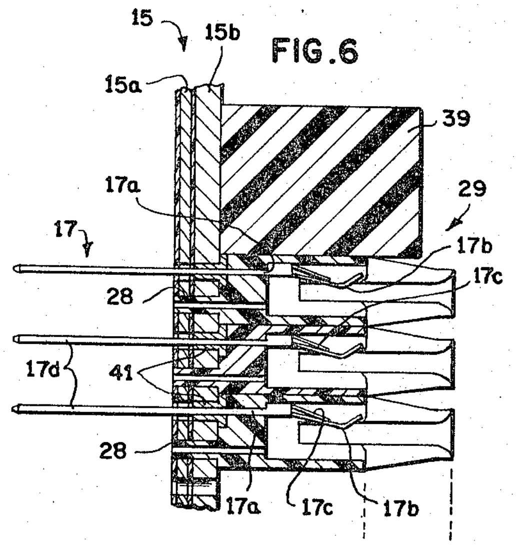

FIG. 6 is another sectional view of a portion of the connector panel shown in FIGS. 3 and 4, taken along line 6—6 in the direction of the arrows, to show the structure of three typical bottom end connector modules of three adjacent connector strips.

FIG. 6*a* is an enlarged perspective view of a typical plastic housing of the bottom end connector module shown in FIG. 6.

Figures 7, 7A:
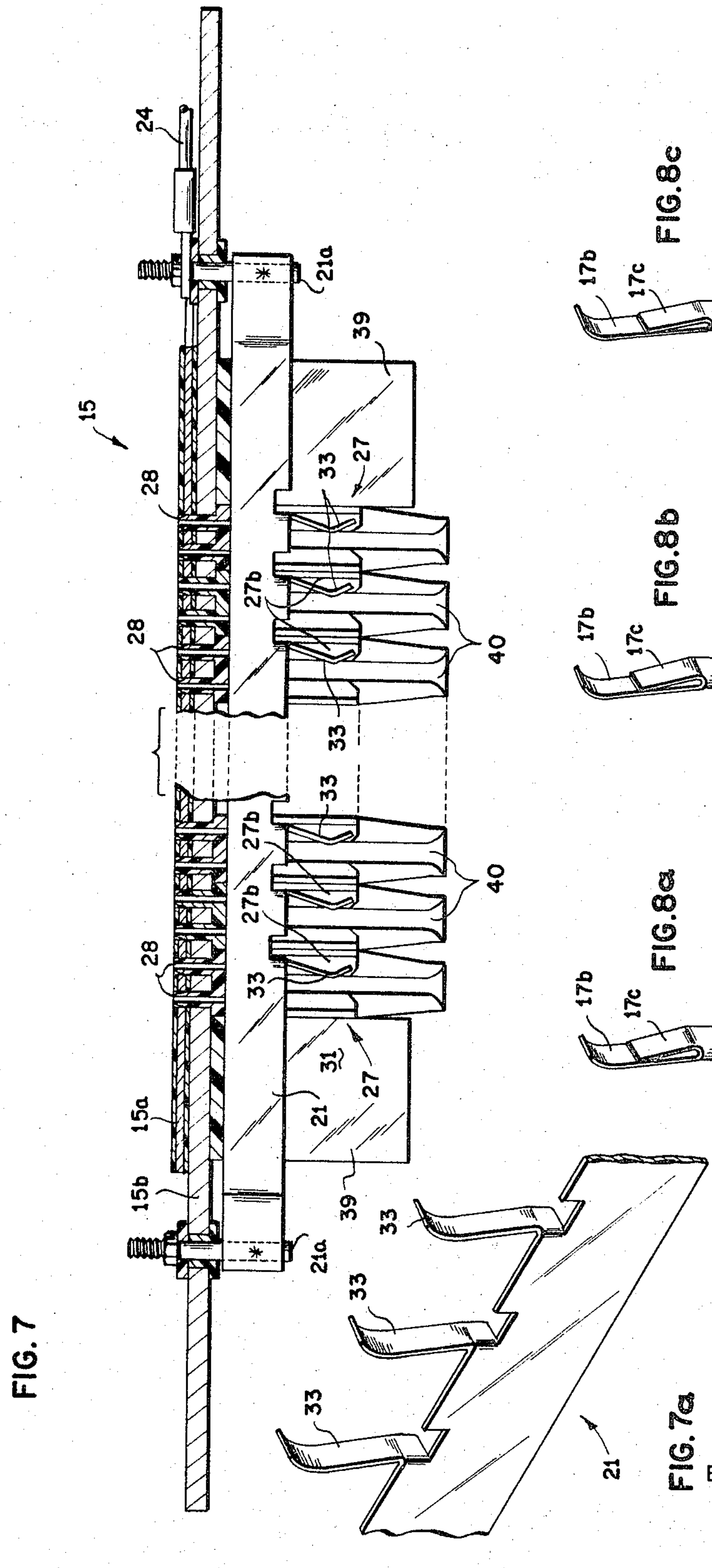

FIG. 7 is a sectional view of the panel, taken along line 7—7 in the direction of the arrows, showing an upper voltage contact strip and certain other details of construction of the connector panel.

FIG. 7*a* is a perspective view of a portion of the voltage contact strip shown in FIG. 7.

Figure 8C:
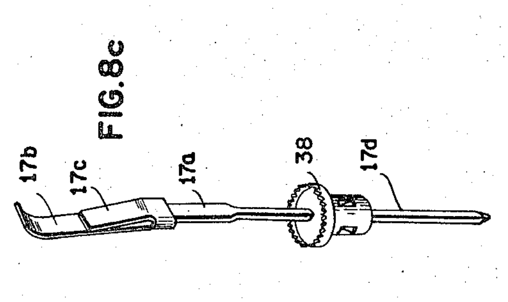
Figure 8B:
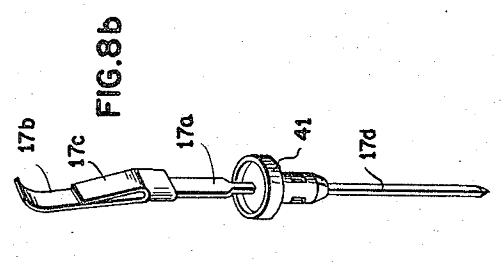
Figure 8A:
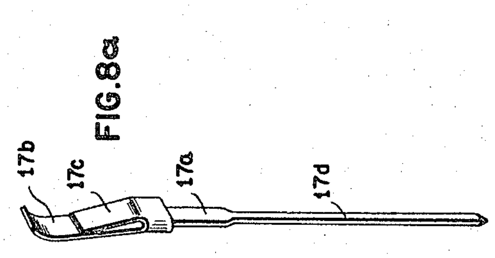

FIG. 8*a* is an enlarged perspective view of a typical terminal contact for the connector panel.

FIG. 8*b* is another enlarged perspective view of the terminal contact shown in FIG. 8*a* with a ground-plane connector bushing positioned thereon for use as illustrated in FIG. 6.

FIG. 8*c* is an enlarged perspective view of the terminal contact shown in FIG. 8*a* with a voltage-plane connector bushing positioned thereon for use as illustrated in FIG. 5.

Figure 1:
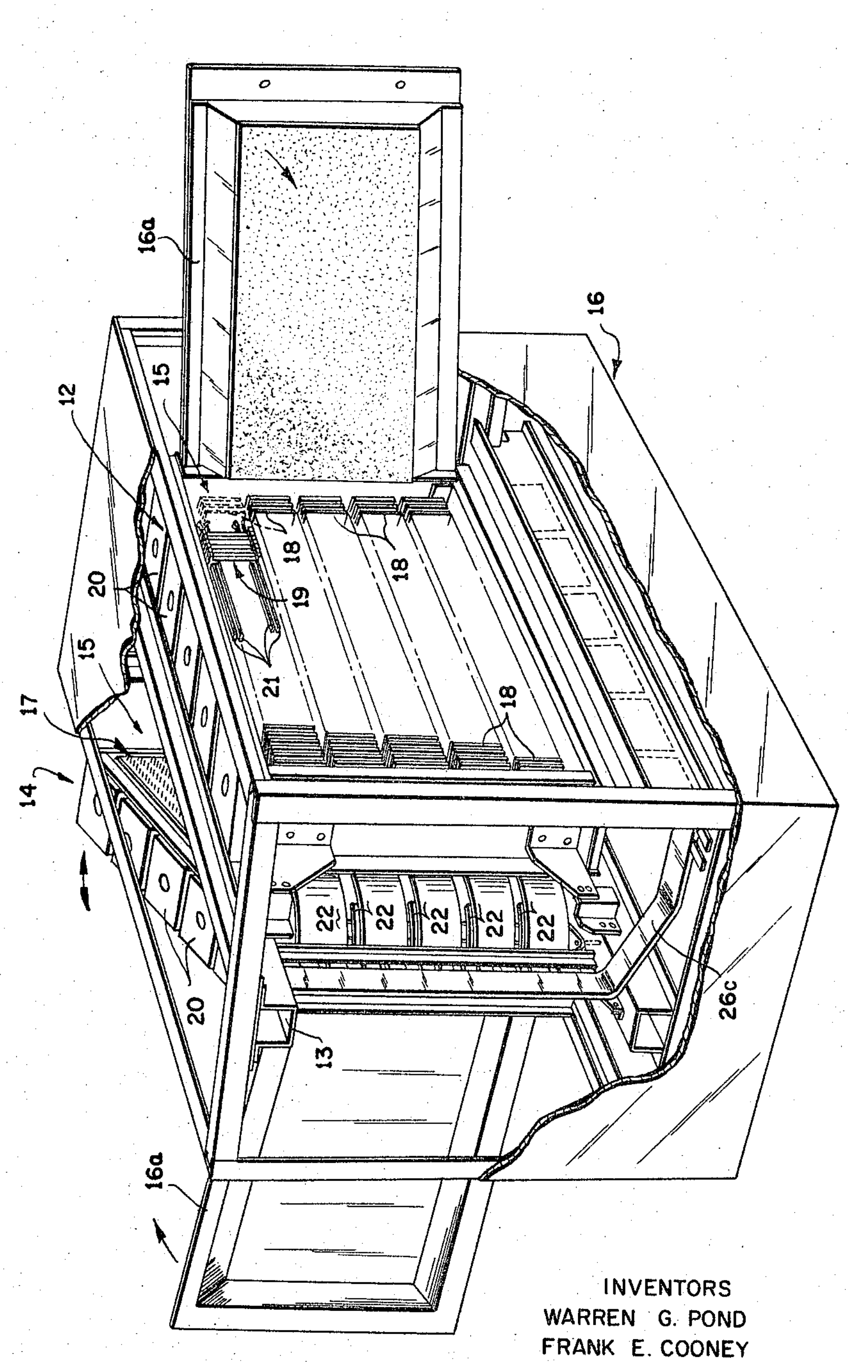
FIG. 1 is a perspective view of the present invention showing a typical processor section of a data processing system including high-density packaging of integrated circuits on two separate microcircuit assemblies which open to provide access to circuit interconnections for microcircuit boards.
Figures 9, 10:
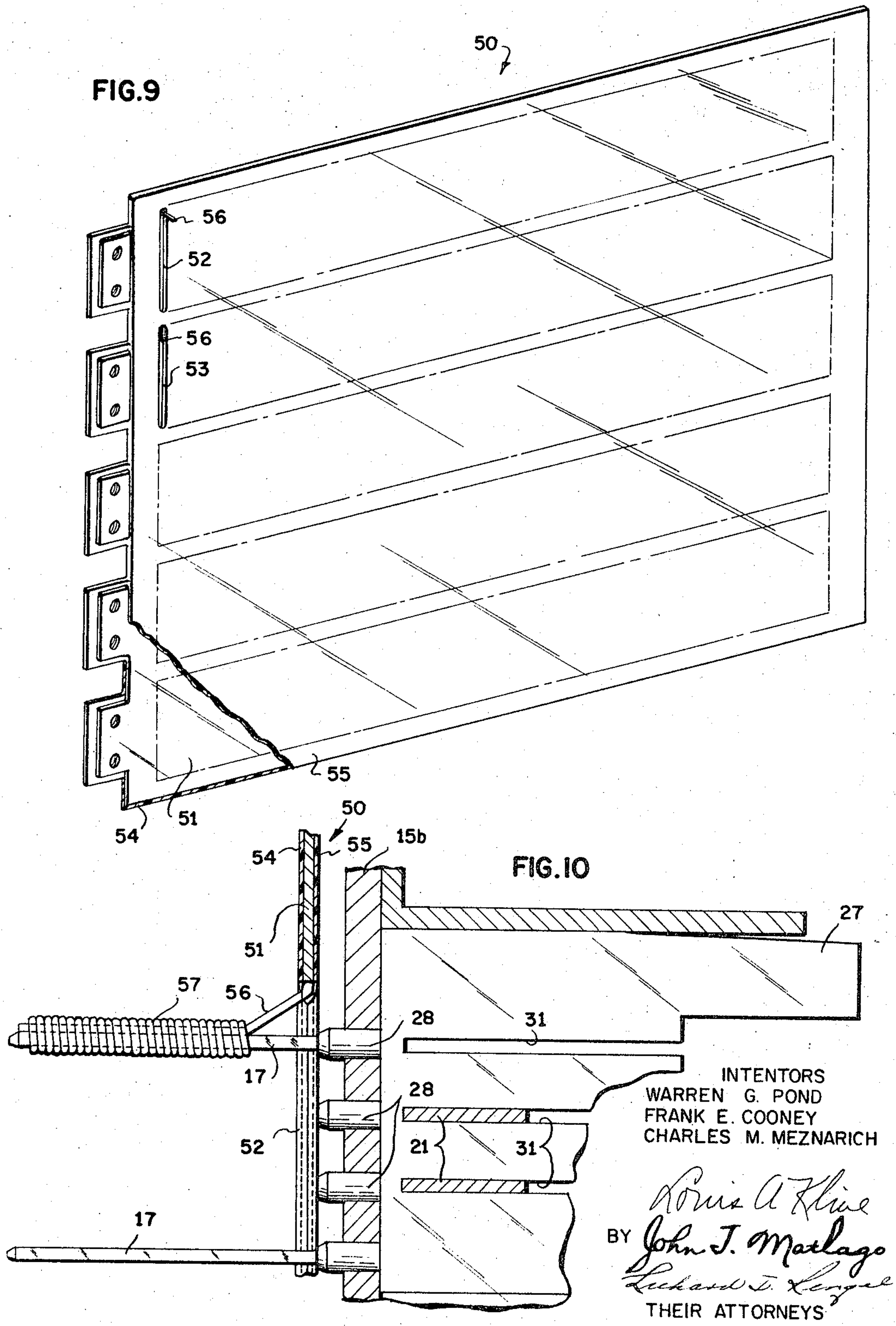

FIG. 9 is a perspective view of an alternate embodiment of the voltage plane for the connector panel illustrated in FIGS. 1 to 3.

FIG. 10 is an enlarged view of a portion of the connector panel utilizing the alternate voltage plane of FIG. 9 and showing the interconnection of the terminal portion of the terminal contact to the voltage plane.

Referring now to the drawings, FIG. 1 shows a typical section or bay of a data processing system which provides high-density packaging of integrated logical circuits for the processor section of the data processing system, for example. This section is shown to include separate microcircuit assemblies 12 and 14 including connector panels 15 mounted back-to-back in a cabinet 16. The connector panels 15 are movably mounted on a cabinet frame 13 by hinges, for example, in order to provide access to terminal contacts 17 on the back side of panels 15 for testing of the logical circuits on microcircuit boards 18 individually retained by respective connector strips 19 on the front sides of the respective panels. In FIG. 1, a portion of the top row of microcircuit boards 18 are removed from the connector panel 15 to show the connector strips 19 and voltage contact strips 21, which distribute certain supply voltages to microcircuit boards 18 mounted in respective connector strips 19.

Heat dissipation of the logical circuits is provided by rows of small fans 20 which force air past the circuit boards 18. Cabinet doors **16*a* are contoured inwardly to produce a light force against the outer edges of the circuit boards 18 of the respective assembly when the cabinet 16 is closed. In this manner, an air duct is formed which provides maximum air flow between the circuit boards 18 during operation of the processor section, and also provides pressure on the outer edges of the circuit boards 18 to maintain these boards in their respective locations in the connector strips 19 of panels 15 of assemblies 12 and 14**.

Supply voltage distribution is provided to each of the circuit assemblies 12 and 14 from a power supply source (not shown), which is coupled to voltage bus bar **26*c* and insulated conductors 24 (FIG. 2). Voltage bus bar 26*c* includes laminations of conductor straps, separated by insulation, for coupling the logical voltage levels (e.g., +4 v. and 0 v.) to each strip of a set of five flexible conductor strips (voltage hinges) 22. A separate set of flexible conductor strips (not visible) are provided for assembly 14, and the voltage bus bar 26*c* is also connected to this separate set of conductor strips for assembly 14. Each of the flexible conductor strips 22 shown in FIG. 1 comprises laminated sheets of beryllium copper (separated by sheets of insulation, e.g., Mylar sheets) connecting supply voltages for the logical levels from the voltage bus bar 26*c* to voltage planes 15*a*, 15*b* of the connector panel 15, as more clearly shown in FIGS. 2 and 3. Voltage planes 15*a*, 15*b* are connected to predetermined ones of the terminal contacts 17 of panels 15 to supply logical voltage levels (e.g., +4 v. and 0 v.) to logical circuits connected to these terminal contacts via printed terminals 18*a* on circuit boards 18** (FIG. 3*b*).

At this point, it is important to note that the laminated conductors and insulator sheets of volage planes **15*a*, 15*b*, flexible conductor strips 22, and bus bar 26*c*, because of their large opposing surface areas, provide a large distributed capacitance which is important to proper supply voltage distribution at high frequencies. This distributed capacitance and the capacitance of bypass or filter capacitors 23 for microcircuit boards 18 supply the high frequency component in the frequency range of 50 to 100 kilocycles in voltage distribution to the integrated logical circuits 25** shown in FIG. 3*b*. The voltage supply source and connections therefrom to the voltage bus bar **26*c* and insulated conductors 24** (FIG. 2) have not been shown since the present invention is concerned primarily with distributing supply voltages in the high frequency range, which is the most difficult problem in electronic data processing equipment. The voltage supply source and these connections provide for distribution of supply voltages primarily in the low and medium frequency ranges below 50 kilocycles for low and medium frequency changes in load conditions.

Referring again to FIGS. 2 and 3 for a more detailed description of a typical section of connector panel 15 of assembly 12, FIG. 2 shows the front side of the upper section of the connector panel 15 including circuit boards 18, a single flexible conductor strip 22 therefor, and the upper section of voltage bus bar 26c which supplies voltage (e.g., +4 v. and 0 v.) to logical circuits on microcircuit boards 18. FIG. 3 shows a portion of the back side of the section of the connector panel 15 shown in FIG. 2 and details of the flexible conductor strip 22. This construction provides individual distribution of supply voltages for logical levels to circuit boards 18 mounted in this section of the connector panel 15. However, it is important to note that distribution of these voltages is also provided internally within voltage planes 15a and 15b of the connector panel 15. Thus, under rapidly changing load conditions of the logical circuits in different areas of the entire connector panel 15, high frequency voltage distribution is provided in the voltage planes 15a, 15b by direct circuit paths between these different areas of connector panel 15. Supply voltage paths between different areas of connector panel 15 are in addition to the paths provided directly to the individual sections of the panel 15 by flexible conductor strips 22 and occur as a direct result of many logical circuits in a first area or section of panel 15 switching to a low logical voltage level (0 v.) and many logical circuits in a second area of panel 15 switching to a high logical voltage level (+4 v.) wherein the circuit path of minimum delay to the second area is via the first area of panel 15, for example. This characteristic of high frequency voltage distribution is due, at least in part, to the inductive reactance of supply circuit paths to the first and second areas of panel 15 through the flexible conductor strips 22 and the voltage planes 15a, 15b, even though inductive reactance has been minimized by the use of planar conductive strips and sheets. Accordingly, the voltage planes 15a, 15b, provide for an infinite number of supply circuit paths to the circuit boards 18 mounted on the panel 15 and the voltage planes 15a, 15b are particularly suitable for extending supply voltage paths directly from circuit boards disposed in one area of panel 15 to circuit boards disposed in another area of panel 15 under rapidly changing load conditions.

The connector strips 19 are arranged vertically in a horizontal row across the section of connector panel 15 to support the circuit boards 18 in this section, as shown in FIGS. 2 and 3. A portion of the next lower section of connector panel 15, including the upper portion of circuit boards 18 for that section, is also visible. The manner in which individual connector strips 19 are formed to provide for removably holding circuit boards 18 and providing electrical connections thereto by contact terminals 17 is made evident in FIGS. 4 to 6, which show the details of a typical connector strip 19.

Each connector strip 19 is formed by mounting a series of individual center connector modules 26 (FIG. 4a) and end connector modules 27 and 29 in any pair of vertical columns of holes in a section of connector panel 15. In FIG. 6a, a typical plastic housing for the lower end module 29 is shown (without terminal contacts 17) and upper end module 27 is identical thereto except no aperture 29c is provided. Thus, the upper end module 27 has a uniform arrangement of eight tapered end projections 28. Each connector strip module, e.g., module 26 (FIG. 4a), includes a plurality of the small, circular and tapered end projections 28 which seat in corresponding columns of holes in connector panel 15. Each of these end projections 28 has a square, axial opening which passes the lower terminal end 17d of terminal contacts 17 to seat the upper contact end 17b in position in the contact chamber of module 26 as shown. An intermediate section 17a of the contact terminal is rectangular and seats in the corresponding rectangular opening in module 26. The upper or contact section 17b of contact terminal 17 includes a spring biasing section 17c (FIG. 8a) for positive engagement of the contact section 17b against corresponding printed contact terminals 18a of the circuit board 18 (FIG. 3b). In FIG. 3, which shows the back side of connector panel 15, the voltage planes 15a and 15b are shown to be formed of laminations of perforated plates or sheets. The tapered end projections 28 of the modules 26, 27 and 29 seat in corresponding holes arranged in sets of two vertical columns in the perforated sheets of planes 15a, 15b to form connector strip 19, as shown more clearly in FIG. 4.

FIGS. 2 and 3 also show the voltage contact strips 21, which pass horizontally through slots 31, 32 of end modules 27, 29 of the row of connector strips 19. FIG. 7a is a perspective view of a section of one of these voltage contact strips 21, which is shown assembled in FIG. 7. Contacts 33 of the contact strip 21 are positioned in contact chambers 27b of respective end connector modules 27 to engage the corresponding pairs of printed terminals 27a of microcircuit board 18 shown in FIG. 3b. The contact strips 21 are shown in FIG. 7 to be supported by welding to respective terminal posts 21a, which pass through the voltage plane 15b only, of the connector panel 15. Terminal post 21a is connected to the voltage supply source by conductor 24 to provide an operating supply voltage to contact strip 21. The contacts 33 on contact strip 21 shown in FIG. 7 engage the respective printed terminals 27a of the row of circuit boards 18 to couple the corresponding supply voltage to logical circuits in this section of panel 15. Supply voltages of +12, +24, −24, and −12, for example, are distributed to the logical circuits by the respective ones of the contact strips 21 shown in FIGS. 2 and 3. The panel 15 is reinforced by a panel frame, including frame members of insulating material 39, which have slots for passing contact strips 21.

The important advantage of the structural arrangement for supplying voltages by contact strips 21 is the structure which permits location of the strips 21 on the front side of panel 15 by passing these strips through end connector modules 27 and 29 to position the contacts 33 thereof in the contact chamber as shown in FIG. 7 for module 27. This arrangement provides for engagement of the contacts 33 with the respective printed terminals 27a, 29a on circuit boards 18 (FIG. 3b). The advantage in locating these strips 22 on the front side of panel 15 instead of on the back side of panel 15, for example, is that there is no possibility of interfering with the automatic "wire-wrap" operations which are performed by machine on the terminal ends of contact terminals 17. The reason there is no possibility of interfering with the automatic "wire-wrap" operations is that the terminal ends of contact terminals 17 only project into the area on the back side of the voltage plane 15a of panel 15 and the machine for automatic "wire-wrap" has unobstructed movement about these terminal ends.

Considering now the details of the supply voltage distribution for logical voltage levels (e.g., +4 v. and 0 v.), the structural arrangement, as noted earlier, includes voltage planes 15a, 15b of the connector panel 15. Voltage plane 15b is provided for the reference voltage or ground (0 v.) and comprises a perforated aluminum sheet or plate approximately four feet square and .08 inch thick. The other voltage plane 15a comprises laminations including a perforated copper sheet .02 inch thick or aluminum sheet .03 inch thick, and covered on each side by perforated sheets of insulating material (e.g., Mylar) and secured together by adhesive. The covered voltage plane 15a is, in turn, secured by adhesive to the voltage plane 15b with the perforations or holes aligned to pass the terminal ends 17d of terminal contacts 17 and seat the end projections 28 of connector modules 26, 27, 29 to form the row of connector strips 19.

The voltage plane 15a makes electrical contact with the top row of terminal contacts 17 of connector strips 19, as shown in FIG. 5, by a metal bushing 38 which has a sharp serrated edge (FIG. 8c) for piercing the insulation on the outside of the voltage plane 15a to engage the copper sheet thereof. The bushings 38 are passed over the terminal end 17d of respective terminal contacts 17 and the serrated edge is forced through the insulation to complete a circuit from the copper sheet of voltage plane 15*a* to the terminal contact 17. The contact ends 17*b* of terminal contacts 17 are positioned in the contact cavity or chamber 27*b* of the end connector module 27 to engage the corresponding printed circuit terminals 27*a* on the edge of the respective microcircuit boards 18 (FIG. 3*b*) which are held in vertical slots 40 of the end connector modules 27.

The voltage plane 15*b* is connected to the bottom row of terminal contacts 17 in a similar manner as discussed above for the voltage plane 15*a*. In FIG. 6 the aluminum plate of the voltage plane 15*b* is shown connected to the bottom row of terminal contacts 17 by bushings 41 that are shown more clearly in the perspective view of FIG. 8*b*. The bushings 41 are positioned on the terminal ends 17*d* of respective terminal contacts 17 prior to placing the modules 29 on the connector panel 15. The recessed portion 29*c* of modules 29 (FIG. 6*a*) receives the ground bushing 41 in positioning the same on terminal contact 17.

In the assembly of connector modules 26, 27 and 29, all of the terminal contacts 17 are seated in the plastic housing of the modules for connector strips 19 by first passing the terminal ends 17*d* through the contact chamber therefor. As shown in FIG. 4*a*, the terminal ends 17*d* of terminal contacts 17 are square, and corresponding square ducts are provided in the end projections 28. Contact alignment and positioning are provided by rectangular ducts below the contact chambers which seat the corresponding rectangular portions 17*a* of terminal contacts 17 whereby contact ends 17*b* are disposed for engagement and electrical contact with the respective printed terminals on the edge of circuit board 18 (FIG. 3*b*).

Connector strips 19 are formed in the process of assembly of connector panels 15 by seating each of the modules 26, 27, 29 in their proper positions. The locations of each of the modules 26, 27 and 29 to form the individual connector strips 19 are shown in FIGS. 2 and 4. After assembly of the connector strips 19 in the connector panel 15, the metal bushings 38 are passed over terminal ends 17*d* of the top row of terminal contacts 17 and pressed into contact with the copper sheet of the voltage plane 15*a* to complete circuits from the voltage plane 15*a* to the respective terminal contacts 17 to provide a supply voltage connection for the high logical level (e.g., +4 v.) to the logical circuits 25 on boards 18 via the printed terminals 38*a* (FIG. 3*b*) engaging the terminal contacts 17. The ground bushing 41 firmly seats in the voltage plane 15*b* to complete the ground connections from the voltage (ground) plane 15*b* to the terminal contacts 17, the printed terminals 41*a* of the circuit boards 18 (FIG. 3*b*) and the logical circuits thereon.

Referring now to FIGS. 3 and 3*a* for a detailed description of the flexible voltage strip 22, which connects the voltage planes 15*a*, 15*b* to the supply source, it was noted earlier in the discussion of FIG. 1 that five (5) flexible strips 22 are provided for respective sections of each connector panel 15. Since voltage planes 15*a*, 15*b* are continuous, except for perforations, and extend substantially over the entire area of the connector panel 15, it is evident that each of the individual flexible strips 22 provides proximate interconnections (shortest voltage supply paths) to respective ones of the five (5) panel sections. Further, it is important to note and distinguish the strips 22, which provide flexible distribution of supply voltages and flexible signal interconnecting strips (not shown) for other signal voltages. In the interconnection of these other signal voltages, the load conditions do not normally present the problems encountered in distribution of supply voltages because these other signal voltages do not present the large current requirements involved in voltage supply distribution. Accordingly, flexible interconnection strips for these other signals comprise many narrow lead lines (maximum width of approximately ¼ inch) wherein bending and flexing do not cause breakage of these narrow lead lines. The large current and low impedance requirements for supply voltage distribution necessitate the use of relatively wide sheets of copper (or aluminum) having the low inductive impedance for supplying these large currents at high frequencies.

As shown in FIGS. 3 and 3*a*, the flexible conductor strip comprises laminations of beryllium copper sheets (or aluminum) 44, 46 (.003 inch thick and 2½ inches wide) which are separated and covered by polyester insulator sheets 45 (polyethylene terephthalate, i.e., Mylar, .007 inch thick). Between the sheets of copper and insulation are sheets 47 of pressure sensitive, thermosetting, adhesive tape (i.e., Permacel No. 257). This tape comprises a polyester sheet (Mylar .001 inch thick) having thermosetting adhesive on both sides and a total average thickness, including adhesive, of .0035 inch. As shown in FIG. 3, the separate sheets 44, 46 of copper are exposed for contact with corresponding voltage planes 15*a* and 15*b* of connector panel 15 on one end, and corresponding copper strips of the voltage bus bar 26*c* (FIG. 2) on the other end. These exposed areas of copper are plated with tin to prevent corrosion. Uniform contact with the respective voltage planes 15*a* and 15*b* is provided by fastening the corresponding end of the conductor strip 22 to the panel 15 by plates 44*b* and 46*b* and bolt fasteners which maintain the opposing exposed (tin plated) areas of the copper sheets 44 and 46 and voltage planes 15*a* and 15*b* in firm engagement for good electrical contact. The copper sheets of the opposite end of strip 22 are divided into sections 44*a* and 46*a* across the width of the strip to provide separated exposed areas (tin plated) for making electrical contact with respective opposing plated sections 26*a*, 26*b* of copper strips of the voltage bus bar 26*c*.

As shown in FIG. 1, the five flexible conductor strips 22 provide interconnections between the stationary voltage bus bar 26*c* and connector panel 15. Whenever it is necessary or desirable to move assemblies 12 or 14 to provide access to the wiring in the back thereof, the conductor strips 22 are flexed. Over a period of time, it was known that ordinary copper sheets of substantial width would not be able to withstand repeated flexing because of fatigue induced therein, which caused breakage and cracking, even when the sheets were laminated in sheets of flexible insulating material. Very often, this was produced by non-uniform flexing of these latter conductor strips which caused all of the flexing along lines across the width thereof rather than uniform flexing along the length of the conductor strip. Very often, the flexing would tend to occur along two lines adjacent end clamps and across the width of the conductor strip. Reinforcing the area next to the end clamps caused the lines of flexing to move outside the reinforced area and toward the center of the conductive strip. Even a gradual tapering of this reinforcement did not provide a solution to this familiar problem of attempting to provide uniform bending of a flexible member. However, the conductor strip 22 of the present invention has provided flexing to 90° over 100,000 times without producing fatigue or non-uniform bending along the length of this conductor strip.

Accordingly, the conductor strip 22 provides a flexible interconnection having a low inductive impedance and a large distributed capacitive reactance for distribution of logical voltage levels by a supply voltage (+4 v.) and reference voltage (0 v.) from the stationary voltage bus bar 26*c* to the voltage planes 15*a*, 15*b* of the movable connector panel 15.

The preferred embodiment of the present invention described provides high frequency voltage distribution for other sections of a data processing system in the same manner as described in connection with the processor section. The high-density packaging environment disclosed is essential to high-speed operation of the data processing system where nanosecond delays due to wire lead length must be minimized to maintain operating speeds of the system. The provision of adequate high frequency voltage distribution for data processing systems operating at high speed (e.g., 500 nanosecond operating cycle time or less) is equally important since these high-speed systems cannot operate at higher speeds than the supply voltage distribution is capable of providing. Accordingly, prior supply voltage distribution systems relying upon wires, for example, for interconnection to individual circuit boards are no longer feasible because of the relatively high inductive impedance and low distributed capacitance of these wires which produce time delays of too long duration for supplying voltages to different locations of logical circuits at the switching speeds of these circuits.

Referring now to FIGS. 9 and 10, the alternate embodiment of the present invention is shown to comprise a modification of the voltage plane 15*a* of the connector panel 15 of the preferred embodiment, as shown in FIG. 2. The voltage plane of the alternate embodiment is shown in FIG. 9 and the structural arrangement of the connector panel is shown by the enlarged view of a portion of the connector panel including a section of end connector module 27 and voltage plane 15*b* (also shown in FIG. 4). Voltage plane 50 comprises a copper sheet 51 (.02 inch thick), or aluminum sheet .03 inch thick, having rows of narrow vertical slots 52, 53 and sheets including material (polyester film, Mylar) 54, 55 to prevent electrical contact with the terminal contacts 17 except for the upper terminal contact 17 in slot 52, as shown in FIG. 10. In each slot 52, 53 and the other slots shown in FIG. 9, a tab 56 is formed from the continuous material of the copper sheet 51. This tab 56 is formed in the process of stamping out the slots in the copper sheet 51. These slots are made narrow to retain sufficient copper for high frequency voltage distribution. In the process of laminating the sheets of insulation to the copper sheet 51 by an adhesive coating, the tabs 56 are not covered so that they can make electrical contact with the terminal portion of upper terminal contact 17 (FIG. 1) during automatic "wire-wrap" when wire 57 is automatically wrapped around the terminal 17 and upper section of tab 56.

In the assembly of connector panels having voltage plane 50, the terminal contacts 17 projecting from a single connector strip, including module 27, pass through a single vertical slot 52. Vertical columns of terminal contacts 17 projecting out from other connector strips pass through respective vertical slots of voltage plane 50. The completed connector panel provides for automatically "wire-wrapping" the tabs 56 to the corresponding terminal contacts 17 at the same time the other terminal contacts 17 are "wire-wrapped," whereby the separate operation of fitting a metal bushing on terminal contacts (e.g., fitting metal bushing 38, as required by the preferred embodiment) is eliminated.

In accordance with the present invention as disclosed by the preferred and alternate embodiments, it is contemplated that as many voltage planes as required will be provided. Any supply voltage in a data processing system that requires high frequency voltage distribution will be interconnected to the circuit boards 18 by a separate voltage plane. Accordingly, if the voltage distribution of any of the voltages shown supplied by voltage contact strips 21, or any other additional voltages, require voltage planes, additional laminations of insulated copper or aluminum sheets are formed into the connector panel 15 to accommodate the distribution of these voltages.

In the light of the above teachings, various modifications and variations of the present invention are contemplated and will be apparent to those skilled in the art without departing from the spirit and scope of the invention.

What is claimed is:

1. A supply voltage distribution circuit arrangement for high density assembly of microcircuit boards comprising: a connector panel including a plurality of voltage planes having an array of openings, said voltage planes being superimposed on one another to align said openings and to provide a large distributed capacitance for supply voltages applied thereto wherein each of said voltage planes comprises a planar sheet of electrically conductive material providing a large surface area to minimize the inductive impedance thereof for distribution of said supply voltages; a row of elongated connector strips mounted on the front of said connector panel for retaining a row of microcircuit boards, each of said connector strips including an elongated body of insulating material having side, bottom and end walls forming a longitudinal groove for retaining a respective one of said microcircuit boards along one edge between said side walls, said connector strip further including a column of contact chambers between said groove and said side walls and terminal ducts passing through said bottom wall and aligned with respective ones of contact chambers and the openings in said panel; and a plurality of terminal contacts for each of said connector strips, each of said terminal contacts comprising an elongated member of conductive material including a contact portion disposed in a respective one of said contact chambers for making electrical contact with the corresponding microcircuit board and a terminal portion passing through a respective one of said ducts and a corresponding aligned opening of said array to provide an array of terminals on the back of said panel for microcircuit interconnections.

2. The supply voltage distribution circuit arrangement according to claim 1 in which said elongated body includes projections extending the respective terminal ducts below the bottom wall of said body, said projections seating in respective openings in said voltage planes to secure the connector strips to said connector panel and insulate the terminal portions of said terminal contacts from said planar sheets of conductive material of said voltage planes.

3. The supply voltage distribution circuit arrangement according to claim 1 in which said connector panel comprises a plurality of sections and the voltage planes comprise continuous sheets extending throughout said sections, and each section includes a row of connector strips having terminal contacts connecting said voltage planes to said microcircuit boards wherein said voltage planes provide direct supply circuit paths for microcircuit boards from any section of said panel to any other section under rapidly changing load conditions.

4. The supply voltage distribution circuit arrangement according to claim 3 in which said connector panel is mounted for movement about one edge thereof and a flexible conductor strip is provided for each section of said panel and connected to said voltage planes along said one edge, each of said flexible conductor strips comprising a laminate including a plurality of flexible sheets of conductive material extending substantially the width of said strip and connected to respective sheets of conductive material forming said voltage planes, a polyester film on each side of said flexible sheets, and a pressure sensitive adhesive bonding said sheets and film together to form a firm flexible strip capable of withstanding repeated flexing without breaking and providing supply voltage circuit interconnections to said panel having a low inductive impedance and a large distributed capacitance wherein said voltage planes and flexible conductor strips provide for high frequency supply voltage distribution to microcircuit boards mounted on said connector panel.

5. The supply voltage distribution circuit arrangement according to claim 4 in which the sum of the widths of said flexible conductor strips for said sections is at least one-half of the length of said voltage planes along said one edge of said panel in order to minimize the inductive reactance thereof at high frequencies and each of the flexible sheets is sufficiently thick to provide a low resistance supply voltage circuit interconnection.

6. In a high-density microcircuit board assembly, the combination comprising: a row of connector strips, each including an elongated body formed of insulating material having a bottom wall, opposing side walls and projecting end portions forming a central groove extending the length of said strip for receiving and retaining one of said microcircuit boards along one lateral edge and a portion of adjacent edges of said microcircuit board, said body further including a column of contact chambers formed by said side and bottom walls along said groove, narrow ducts formed in said bottom wall and opening into said contact chambers, and transverse slots formed in opposing side walls and extending into the bottom wall of predetermined ones of said contact chambers in said body; terminal contacts having contact portions disposed in predetermined ones of said contact chambers to engage the lateral edge of said microcircuit boards to make electrical contact therewith, and slender terminal portions passing through said narrow ducts to seat said terminal contacts in said connector strip; and a supply voltage contact strip for distributing a supply voltage to said microcircuit boards including an elongated strip of conductive material having contact sections projecting from a longitudinal edge thereof, said contact strip extending transverse to said connector strips and disposed in the portions of the transverse slots formed in said bottom walls of the row of connector strips so that said contact sections are positioned in a corresponding row of contact chambers adjacent said bottom walls to engage microcircuit boards retained by said row of connector strips to distribute said supply voltage to said microcircuit boards.

7. The combination according to claim 6 in which said elongated body comprises a substantially continuous lower section having terminal projections extending each of said narrow ducts beyond said lower section to insulate said terminal portion and each of said transverse slots is open at one end to receive said contact strip and closed at the other end by said lower section.

8. The combination according to claim 7 which further includes a panel comprising a plurality of laminations of sheets of conductive material separated by insulation to provide supply voltage planes including a reference voltage plane, said panel having an array of openings for passing said terminal portions of said terminal contacts and means for connecting predetermined terminal contacts to respective voltage planes to provide supply voltages including a reference potential to microcircuit boards retained by said connector strips and making electrical contact with respective ones of said predetermined terminal contacts.

9. The combination according to claim 8 in which said panel comprises a plurality of sections, each section having an array of openings for seating a row of connector strips, and said voltage planes comprise continuous sheets of conductive material each extending over all of said sections to provide many voltage supply circuit paths within said panel to microcircuit boards retained by said rows of connector strips.

10. The combination according to claim 8 in which at least one of said voltage planes comprises a sheet of conductive material having elongated openings wherein each opening passes a plurality of terminal portions of terminal contacts for a respective connector strip.

No references cited.

ROBERT K. SCHAEFER, *Primary Examiner.*

J. R. SCOTT, *Assistant Examiner.*